ent Office 3,551,472
Patented Dec. 29, 1970

3,551,472
LIQUID HYDROXYL TERMINATED POLYMERS OF BUTADIENE-ACRYLONITRILE
Alan R. Siebert, Maple Heights, Ohio, assignor to The B. F. Goodrich Company, New York, N.Y., a corporation of New York
No Drawing. Filed May 22, 1968, Ser. No. 731,269
Int. Cl. C07c *121/40*
U.S. Cl. 260—465.4     3 Claims

ABSTRACT OF THE DISCLOSURE

Hydroxyl terminated polymers are prepared by the reaction of carboxyl terminated polymers with a diol in the presence of an acid catalyst. They are useful as adhesives and caulking compounds.

CROSS REFERENCE TO RELATED APPLICATION

Serial No. 731,281 filed May 22, 1968 by A. R. Siebert.

BACKGROUND OF THE INVENTION

Hydroxyl terminated liquid olefinic polymers are useful as cross linking agents with difunctional polymers, as adhesives, and as caulking and potting compounds. They cure readily through reaction of the terminal hydroxyl groups with organic diisocyanates to form solid high molecular weight materials of low fusibility.

These liquid polymers may be hydroxyl terminated homopolymers such as polybutadiene, copolymers such as butadiene-acrylonitrile containing up to 30% bound acrylonitrile and highly saturated polymers such as polyalkyl acrylates whose alkyl moieties consist of 1–8 carbon atoms.

Hydroxyl functional polymers can be produced from olefinic polymers by first converting a portion of the olefinic bonds of the polymer to ozonide linkages, and then reductively cleaving the ozonide linkages to produce hydroxy terminated polymer.

Alternative processes of manufacture are desirable and constantly being sought in the art. Furthermore, polymers prepared by cleavage of higher molecular weight chains as described above generally do not achieve hydroxyl functionality at each end of the polymer chains, that is the final hydroxyl functionality is generally considerably less than 2, often 1.6 to 1.8. For most efficient use of the reactants and the obtainment of the best overall properties, it is desirable to have final hydroxyl functionality as close to 2.0 as possible.

SUMMARY OF THE INVENTION

Carboxyl terminated polymers of polybutadiene, butadiene-acrylonitrile copolymer and polyalkyl acrylates are known in the art. It has now been discovered that it is possible to readily convert these carboxyl terminated liquid polymers to hydroxyl terminated liquid polymers with a high degree of difunctionality, i.e. practically 2, indicative of the fact that a hydroxyl group is located at each end of the polymer chain. The property of difunctionality is essential if higher polymers are to be produced by the subsequent curing reactions. This conversion is accomplished by reaction of a liquid carboxyl terminated polymer with a 5–10 fold excess of a difunctional hydroxy compound, preferably a liquid diol of the formula

HO—R—OH where R is a methylene chain of 3 to 6 carbon atoms in the presence of 0.3 to 0.5 part of an acid catalyst. Water of reaction forms as a by-product and must be removed either by having it dissolve in the reaction medium or by distilling it off, preferably at atmospheric pressure, below the boiling point of the reaction medium. Reaction media then are solvents that will dissolve the carboxyl terminated polymers, and the hydroxyl terminated polymers which are formed and will either (1) dissolve up to 5% of their own weight of water, or (2) have a boiling point greater than 110° C. so that water of reaction can be distilled off at 100° C. without loss of solvent. Acetone, dioxane, methylethyl ketone, tetrahydrofuran, and cyclohexanone are typical solvents.

Carboxyl terminated polymers of butadiene, butadiene-acrylonitrile and polyalkyl acrylate can be produced by the process taught in U.S. Pat. 3,285,949. Preferably the desired monomers and placed in a solvent with a low chain transfer potential, preferably tertiary butanol, and a bis-azocyano acid initiator, preferably azodicyanovaleric acid is added. Polymerizations are run at 70°–80° C. Product polymer is thrown down with methanol and separated by decantation. These carboxyl terminated polymers are curable with diisocyanates. It has been discovered that when liquid carboxyl terminated polymer is reacted with a difunctional hydroxyl compound, preferably a diol, in the presence of an acid catalyst, the chain terminal group is opened up and converted from carboxyl to hydroxyl. The preferred diol is 1,4-butanediol. Catalysts that may be employed in the range of .3 to .5 part per hundred of polymer include mineral acids such as hydrochloric, sulfuric and phosphoric acids and organic acids such as p-toluene sulfonic acid and the like. The preferred catalyst is dodecyl benzene sulfonic acid.

Molecular weights of the polymers are determined with a Mechrolab Vapor Pressure Osmometer using methyl ethyl ketone (MEK) or toluene as the solvent. The instrument is calibrated with azobenzene and sucrose octaacetate. Molecular weight may also be calculated from the chemical equivalents per hundred of rubber of carboxyl (ephr.) value determined by titration of polymer solution with alcoholic KOH to a phenolphthalein endpoint. Functionality of the polymer is defined as the ratio of the osmometer molecular weight (corrected for antioxidant, if any is present) to the calculated ephr. molecular weight times 2, the ideal number of carboxy groups per molecule.

Brookfield viscosity employing an LVT model viscometer and a No. 4 spindle is run on freshly prepared polymers at 27° C. Values up to 50,000–80,000 cps. are accepted by the art as indicative of pourable, easily handled materials.

DETAILED DESCRIPTION OF THE INVENTION

Example 1

A bottle polymerization of butadiene in tertiary butanol is conducted using azodicyanovaleric acid catalyst. When the catalyst is about 75% decomposed, the excess butadiene is vented and the bottle contents are added to methanol with stirring to throw down the liquid polymer. After settling, the methanol-tertiary butanol layer is decanted. One part phenylbetanaphthylamine antioxidant is added to the polymer per 100 parts of polymer which is then dried in a Rinco evaporator to constant weight.

TABLE 1

Tertiary butanol (parts)—100.
Butadiene (parts)—100.
Azodicyanovaleric acid (parts)—4.
Temperature—70° C.
Polymerization time—16 hrs.
Polymer yield—14.8 g.
COOH/Ephr. (equivalent per hundred parts rubber)—.0598.
Brookfield viscosity at 27° C.—26,500 cps.
Mn—MEK—3380.
Mn—calc.—3340.
Functionality—2.02.

100 parts of carboxyl terminated polymer are added with 100 parts solvent to a 3 neck flask equipped with thermometer and agitator. Excess butanediol-1,4 is added calculated on the basis of one mol butanediol per mol of —COOH. Sulfonic acid is employed as a catalyst, the flask is heated to drive the reaction. Water of reaction dissolves in the acetone solvent in (A) and forms a distillable azeotrope in (B). Run (A), in acetone, is conducted in a sealed system to run the reaction at 96° C. Run B, in toluene, is conducted at 116° C. to drive the reaction and remove the solvent-water azeotrope. Reaction is followed by titrating an aliquot from the bottle with standard base using phenolphthalein indicator. The hydroxyl terminated polymer is recovered by adding methanol to throw down the polymer. Potassium hydroxide is added to neutralize the excess acid catalyst. The polymer layer is decanted and dried on a Rinco evaporator.

Data observed on the hydroxyl terminated polybutadiene is listed in Table 2 below:

TABLE 2

| | A | B |
|---|---|---|
| Carboxyl terminated polybutadiene prepared above, g | 100 | 100 |
| Acetone, g | 100 | |
| Toluene, g | | 100 |
| 1,4-butanediol, g | 25 | 25 |
| Sulfonic acid, g | 0.4 | 0.4 |
| Reaction time and temp | (1) | (2) |
| COOH/ephr. hydroxyl terminated product | .007 | .002 |
| OH/ephr. hydroxyl terminated product | .0535 | .057 |
| COOH and OH/ephr. hydroxyl terminated product | .0605 | |
| Brookfield viscosity at 27° C., cps | 27,000 | 22,000 |
| Pot life with 1.0 equivalent of toluene diisocyanate, hrs | >2 | >2 |

1 13 hrs. at 96° C.
2 2 hrs. at 116° C.

The products serve as excellent caulking compounds, being soft and workable initially and setting up gradually to a dry, but yielding state.

When the example is repeated using in place of carboxyl terminated polybutadiene first a carboxyl terminated polymer of butadiene-acrylonitrile containing 11% bound acrylonitrile and analyzing .0782 equivalents of COOH/ephr. and second with a carboxylic poly-n-butyl acrylate having .102 equivalent of COOH/ephr., the products similarly show an almost complete disappearance of COOH groups and when combined with 1.0 equivalent of toluene diisocyanate they have a pot life of greater than 2 hours and show favorable adhesive properties.

I claim:
1. Liquid hydroxyl terminated polymers of butadiene-acrylonitrile prepared by the reaction of liquid carboxyl terminated polymers of butadiene-acrylonitrile, said carboxyl terminated polymers being prepared by the reaction of butadiene and acrylonitrile in tertiary butanol at 70°–80° C. in the presence of a bis-azocyano acid initiator, with a molar excess of a liquid difunctional hydroxy compound of the formula HO—R—OH wherein R is a methylene chain of 3–6 carbon atoms in the presence of 0.3 to 0.5 part per hundred of polymer of an acid catalyst selected from the group consisting of hydrochloric, sulfuric, phosphoric, p-toluene sulfonic and dodecyl benzene sulfonic acids in a reaction medium consisting of a solvent characterized by power to dissolve up to 5% of its own weight of water or having a boiling point greater than 110° C., said reaction medium being maintained at 96°–116° C.

2. The liquid hydroxyl terminated polymers of claim 1 where the amount of said hydroxy compound is 5–30 parts per hundred parts of liquid carboxyl terminated polymer and is calculated to be a 5–10 fold excess on the basis of one mole of said hydroxy compound per mole of —COOH.

3. The liquid hydroxyl terminated polymers of claim 1 where the liquid carboxyl terminated polymer is a copolymer of butadiene-acrylonitrile containing up to 30% bound acrylonitrile.

References Cited

UNITED STATES PATENTS 3,285,949  11/1966  Siebert _____ 260—465.4
3,346,631  10/1967  Boyer et al. _____ 260—465.4X JOSEPH P. BRUST, Primary Examiner U.S. Cl. X.R.
260—77.5, 484